United States Patent
Mitsubayashi et al.

(10) Patent No.: US 7,552,270 B2
(45) Date of Patent: Jun. 23, 2009

(54) SIGNAL TRANSMISSION METHOD, BRIDGE UNIT, AND INFORMATION PROCESSING APPARATUS

(75) Inventors: Hideki Mitsubayashi, Kanagawa (JP); Takeshi Yamazaki, Yokohama (JP); Hideyuki Saito, Kanagawa (JP); Yuji Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 164 days.

(21) Appl. No.: 11/651,417

(22) Filed: Jan. 9, 2007

(65) Prior Publication Data

US 2007/0168594 A1    Jul. 19, 2007

(30) Foreign Application Priority Data

Jan. 16, 2006    (JP) .............................. 2006-008003

(51) Int. Cl.
*G06F 13/00*    (2006.01)
(52) U.S. Cl. ...................... 710/316; 710/110
(58) Field of Classification Search .................. 710/316
See application file for complete search history.

(56) References Cited

U.S. PATENT DOCUMENTS

| | | | |
|---|---|---|---|
| 7,373,449 B2* | 5/2008 | Radulescu et al. | 710/316 |
| 2004/0103230 A1* | 5/2004 | Emerson et al. | 710/110 |
| 2004/0221087 A1* | 11/2004 | Benedetto et al. | 710/316 |
| 2006/0104267 A1* | 5/2006 | Mondinelli et al. | 370/389 |

OTHER PUBLICATIONS

C. E. Leiserson "Fat-Trees: Universal Networks for Hardware-Efficient Supercomputing" IEEE Transactions on Computer, vol. 34, No. 10, pp. 892-901, Oct. 1985.

* cited by examiner

*Primary Examiner*—Khanh Dang
*Assistant Examiner*—Christopher A Daley
(74) *Attorney, Agent, or Firm*—Katten Muchin Rosenman LLP (57) ABSTRACT

An information processing apparatus having a fat tree structure, in which signal transmission across node columns managed by respective processor units is performed through end point bridges included in bridge chips. In this transmission method, the bridge chips perform routing by using node IDs that are given to the respective node columns and levels that indicate the hierarchical depths of the bridge chips, thereby selecting the shortest routes of signals.

11 Claims, 8 Drawing Sheets

SIGNAL TRANSMISSION METHOD, BRIDGE UNIT, AND INFORMATION PROCESSING APPARATUS

BACKGROUND OF THE INVENTION

1. Field of the Invention

The invention relates to information processing technologies, and in particular, to an information processing apparatus having a plurality of processor units, a method of signal transmission of the information processing apparatus, and a bridge unit to be implemented therein.

2. Description of the Related Art

Recently, computers have become more diversified in function, and accordingly, devices to be connected to such computers have also been growing in variety. These devices exchange signals with the CPUs of the computers via buses. Bus bridges are used to connect a bus that are directly connected with the CPUs, to a bus that provide ports for device connection, thereby ensuring compatibility between the different types of buses. In addition, bus bridges can be hierarchically connected to form a device tree of buses of identical type, thereby increasing the number of ports available for device connection.

Meanwhile, information processing apparatuses having a multiprocessor architecture with a plurality of processors or a multihost architecture with a plurality of processor units have been commonly used in recent years to address the demand for faster processing speeds. These parallel processing technologies achieve processing speedup by distributing the processing of a single application over a plurality of processors or a plurality of hosts. An example of the structure of a multihost architecture is a fat tree structure (for example, see C.E. Leiserson "Fat-Trees: Universal Networks for Hardware-Efficient Supercomputing" IEEE Transactions on Computer, Vol. 34, No. 10, pp. 892-901, 1985).

Take, for example, the case of an information processing apparatus that has a multihost architecture. When one application is distributed over a plurality of processor units for processing, access between the device trees can be complicated since the processor units manage different respective buses. Increasing the number of processor units to achieve speedup causes more complex processing of signal transmission and reception between the processor units, thus increasing access times.

Related Art List

C.E. Leiserson "Fat-Trees: Universal Networks for Hardware-Efficient Supercomputing" IEEE Transactions on Computer, Vol. 34, No. 10, pp. 892-901, 1985

SUMMARY OF THE INVENTION

The present invention has been made in view of the foregoing problem. It is thus a general purpose of the present invention to provide a technology for transmitting signals between a plurality of processor units at high speed.

One embodiment of the present invention relates to a signal transmission method. This signal transmission method is one for transmitting a signal to be transmitted between different processor units in an information processing apparatus having a fat tree structure including a plurality of processor units, the method comprising: issuing a signal from one of the processor units; and relaying the signal by a plurality of bridge units. The relaying of the signal includes: inputting the signal to a bridge unit; and selecting which bus to output to and outputting the signal thereto based on an identification number of a column in the fat tree structure to which the bridge unit belongs, a level number of a row to which the bridge unit belongs, and an identification number of a column of bridge units managed by a destination processor unit.

Another embodiment of the present invention relates to a bridge unit. This bridge unit is one for relaying a signal to be transmitted between different processor units in an information processing apparatus having a fat tree structure including a plurality of processor units, the bridge unit comprising: a plurality of bus bridges; an end point bridge which relays signal transmission between end points of two device trees managed by two respective processor units; and a switch routing circuit which selects which bus to output an input signal to. The switch routing circuit includes a register which sets an identification number of a column in the fat tree structure to which the bridge unit belongs, and a level number of a row to which the bridge unit belongs. The switch routing circuit selects which bus to output to based on the identification number and the level number set in the register and an identification number of a column of bridge units managed by a destination processor unit for the input signal to be transmitted to, and controls output accordingly so that the signal passes through any one of the bus bridges and the end point bridge.

A device tree refers to a multilevel tree-like connection of bridges beginning at a root node where a processor unit is located, thereby allowing access to devices lying at tree ends, i.e., end points. In this device tree structure, the bridges, buses, and end points that constitute the tree are each identified and managed by the processor unit that is located on the root node.

Yet another embodiment of the present invention relates to an information processing apparatus. This information processing apparatus includes: a plurality of processor units; and a bridge unit which relays a signal to be transmitted between different processor units. The bridge unit includes: a bus bridge which relays signal transmission within a device tree managed by a single processor unit; an end point bridge which relays signal transmission between end points of two device trees managed by two respective processor units; and a switch routing circuit which selects either one of the bus bridge and the end point bridge to which an input signal to be transmitted between different processor units is output so that the input signal reaches a destination processor unit through a shortest route.

It should be appreciated that any combinations of the foregoing components, and any expressions of the present invention converted among methods, apparatuses, systems, computer programs, and the like are also intended to constitute applicable aspects of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
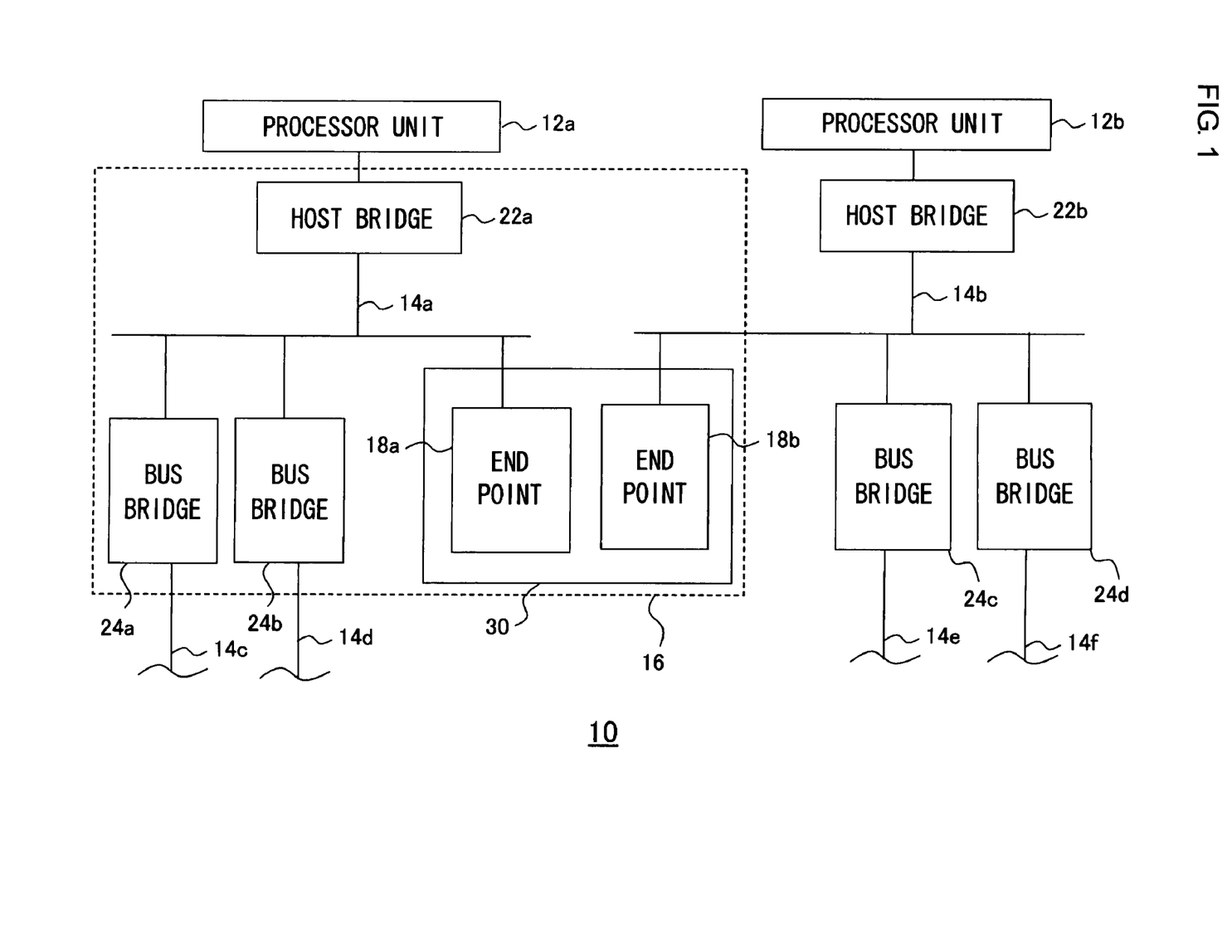
FIG. 1 is a block diagram schematically showing the configuration of a certain unit included in an information processing apparatus according to an embodiment.

Initially, the basic configuration of an information processing apparatus according to the present embodiment will be described. FIG. 1 schematically shows the configuration of a certain component unit included in the information processing apparatus. For example, this configuration can be achieved using a PCI (Peripheral Component Interconnect) bus architecture. The component unit 10 of the information processing apparatus includes processor units 12a and 12b, host bridges 22a and 22b, bus bridges 24a to 24d, and an end point bridge 30. The two processor units 12a and 12b perform arithmetic processing. The host bridges 22a and 22b relay the local buses of the processor units 12a and 12b and PCI or other buses intended for connection with peripheral equipment. The bus bridges 24a to 24d are PCI-to-PCI bridges or the like that relay the same types of buses to each other. The end point bridge 30 provides an interface to the device tree of another processor unit.

The end point bridge 30 relays signal exchange between an end point 18a that is managed by the processor unit 12a and an end point 18b that is managed by the processor unit 12b. The host bridge 22a transmits and receives signals to and from the bus bridges 24a and 24b and the end point 18a via a bus 14a. The host bridge 22b transmits and receives signals to and from the bus bridges 24c and 24d and the end point 18b via a bus 14b. The host bridge 22a, the bus bridges 24a and 24b, and the end point bridge 30 constitute a bridge chip 16 as one signal transmission unit.

Processor units such as the processor units 12a and 12b (hereinafter, referred to collectively as processor units 12) have a multiprocessor structure including, for example, a plurality of processors. The processor units 12 may also include main memories, I/O interfaces, and other components which are not shown. The end point bridge 30 acquires, for example, a signal to be transmitted from one processor unit 12a to the other processor unit 12b via the end point 18a, and transmits it via the end point 18b. The signal sent across the device trees is thereby transmitted between the different processor units 12. The end point bridge 30 applies appropriate conversion processing to input signals so that signals valid in the target device trees are generated before transmission.

The component unit 10 shown in FIG. 1 is one component unit of those information processing apparatuses in accordance with the present embodiment, in which the bus bridges 24a to 24d are further connected with buses 14c to 14f. In actual information processing apparatuses, these buses 14c to 14f may be further provided with bus bridges or end points. In such cases, the buses 14c to 14f may be branched as the buses 14a and 14b to form device trees.

While FIG. 1 shows the processor units 12, each having two bus bridges 24 and one end point bridge 30 connected, the numbers of these components are not limited thereto. Three or more processor units 12 may also be provided. Signal transmission from one processor unit 12 to another processor unit 12 is performed through the end point bridges 30. As will be described later, signal transmission and reception between processor units is sometimes achieved via an end point bridge 30 directly, or through the device tree(s) of an intermediate processor unit(s) via a plurality of end point bridges 30.

Figure 2:
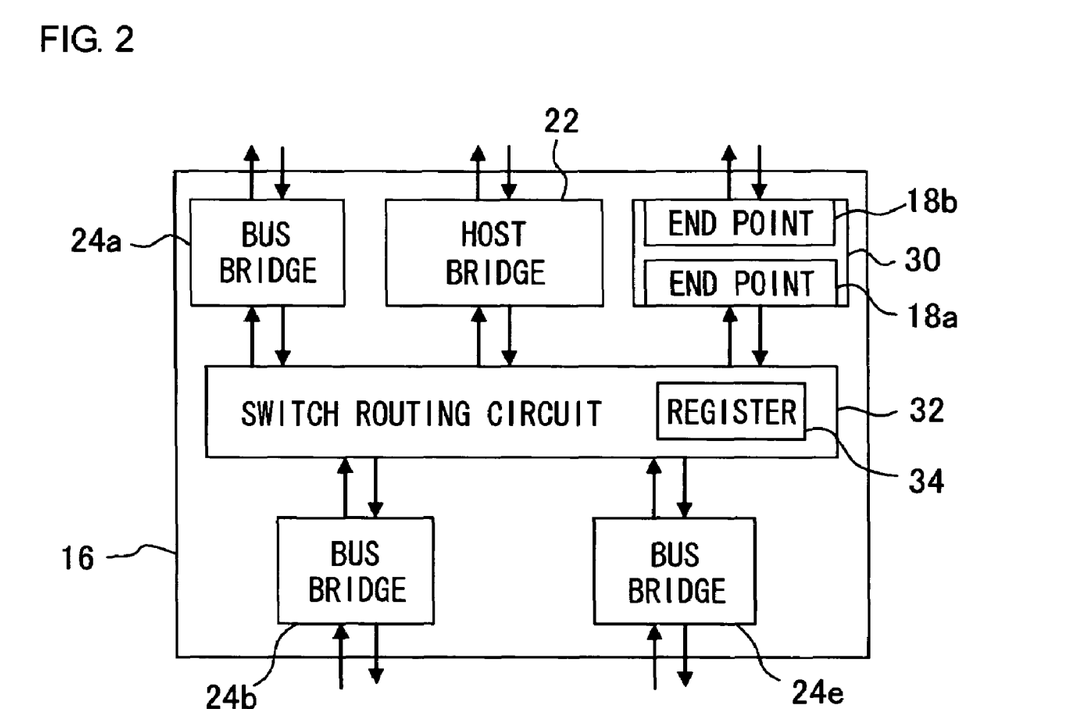
FIG. 2 is a block diagram showing an example of the configuration of a bridge chip to be implemented in the information processing apparatus according to the embodiment.

FIG. 2 shows an example of the configuration of the bridge chip 16 to be implemented in the information processing apparatus of the present embodiment in order to realize the component unit 10 shown in FIG. 1. The bridge chip 16 includes three bus bridges 24a, 24b, and 24e, an end point bridge 30 including end points 18a and 18b, a host bridge 22, and a switch routing circuit 32. The bus bridge 24a, the host bridge 22, and the end point bridge 30 transmit and receive signals to and from units or bridges which are connected on the upstream side of the bridge chip 16. The bus bridges 24b and 24e transmit and receive signals to and from units or bridges that are connected on the downstream side of the bridge chip 16.

The bus bridge 24a and the host bridge 22 are mutually exclusively enabled. The host bridge 22 is used if the unit connected on the upstream side of the bridge chip 16 is a processor unit 12, and the bus bridge 24a is used if it is another bridge chip 16. The end points 18a and 18b in FIG. 2 correspond to the end points 18a and 18b of FIG. 1. More specifically, the end point 18a belongs to the device tree of the processor unit 12a that manages the bridge chip 16, and the end point 18b belongs to the device tree of another processor unit such as the processor unit 12b. Signals to be transmitted and received between the processor unit 12a and the other processor unit therefore pass through the bridge chip 30.

The switch routing circuit 32 selects which bridge to output to so that signals acquired from upstream by the bus bridge 24a, the host bridge 22, and the end point bridge 30, and signals acquired from downstream by the bus bridges 24b and 24e pass through appropriate routes. An example of an appropriate route is the shortest route for a signal issued from the processor unit 12a to reach the destination processor unit 12b. The switch routing circuit 32 includes a register 34 for setting various types of parameters to be referred to when making a route selection. The parameters will be described later.

Figure 3A:
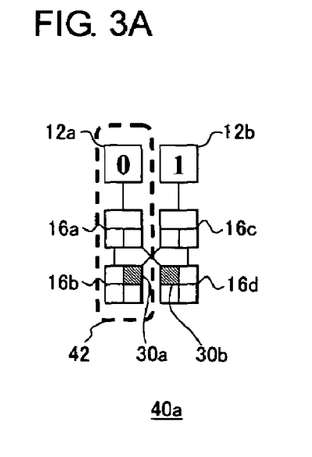
FIGS. 3A to 3C are diagrams schematically showing information processing apparatuses that have fat tree structures including the bridge chip of the present embodiment.
Figure 3B:
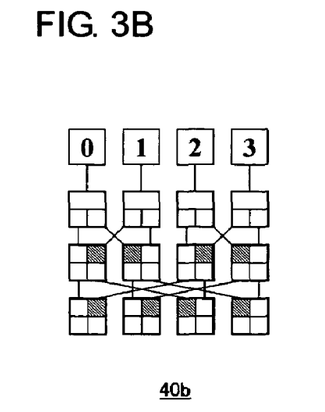
Figure 3C:
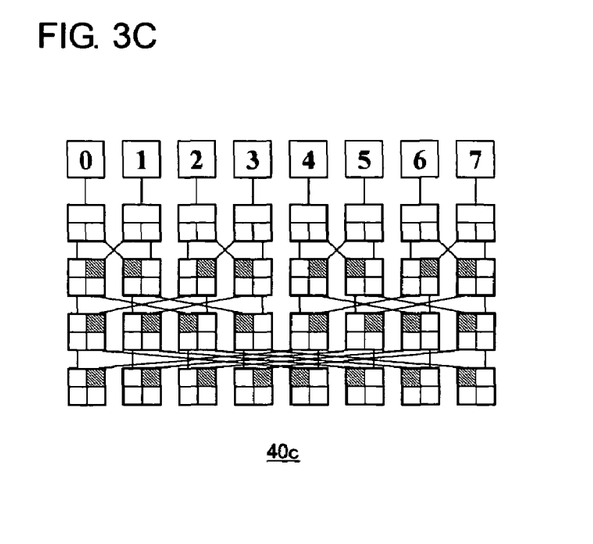

Next, a description will be given of a method by which the switch routing circuit 32 in accordance with the present embodiment, selects an appropriate signal route. Initially, the configuration of the information processing apparatus in accordance with the present embodiment will be described. FIGS. 3A to 3C show information processing apparatuses that have fat tree structures including the bridge chip 16 shown in FIG. 2. FIG. 3A shows an information processing apparatus 40a with two processor units, FIG. 3B shows an information processing apparatus 40b with four processor units, and FIG. 3C shows an information processing apparatus 40c with eight processor units. In FIG. 3A, the numerals "0" and "1" shown in the boxes that represent the processor units 12*a* and 12*b* are numbers given to the respective processor units 12. These numbers will hereinafter be referred to as node IDs.

The processor units 12 are each connected with a series of two bridge chips 16 under its management. For example, the processor unit 12*a* is connected with a series of two bridge chips 16*a* and 16*b*. Hereinafter, this vertical column of a processor unit 12 and a plurality of bridge chips (hereinafter, sometimes referred to collectively as bridge chips 16) will be referred to as a node column 42. In FIG. 3A, the hatched rectangle in the bridge chip 16*b* represents an end point bridge 30*a*. Each of the other rectangles in the bridge chips 16*a* and 16*b* represents a host bridge 22 or a bus bridge 24. FIGS. 3B and 3C are also drawn in the same manner. With four processor units, the node columns have three bridge chips 16 each (FIG. 3B). With eight processor units, the node columns have four bridge chips 16 each (FIG. 3C).

In FIG. 3A, consider, for example, that a signal is transmitted from the processor unit 12*a* to the processor unit 12*b*. In this case, the signal is transmitted across the node columns 42. It is the end point bridge 30*a* or 30*b* (hereinafter, sometimes referred to collectively as end point bridges 30) that functions as an interface in this case. That is, the bridge chips 16 belonging to the respective different node columns 42 are connected via the end point bridges 30. In this instance, signals transmitted across the node columns 42 always pass through at least one or more end point bridges 30.

The signal route in the foregoing example follows either of these two routes: the processor unit 12*a*→the bridge chip 16*a*→the bridge chip 16*b* (the end point bridge 30*a*)→the bridge chip 16*c*→the processor unit 12*b*; and the processor unit 12*a*→the bridge chip 16*a*→the bridge chip 16*d* (the end point bridge 30*b*)→the bridge chip 16*c*→ the processor unit 12*b*.

In the information processing apparatuses having the fat tree structures such as that shown in FIGS. 3A to 3C, the switch routing circuits 32 in the respective bridge chips 16 make a route selection so that signal transmission across the node columns 42 is performed through the shortest route. The shortest route refers to one that minimizes the number of end point bridges 30 a signal passes when transmitting to another node column 42. For this purpose, it is ensured that the direction of signal transmission changes from downward to upward only once before a signal issued from a processor unit 12 in the structure shown in FIGS. 3A to 3C reaches a destination processor unit 12 via a plurality of chips 16.

Figure 4:
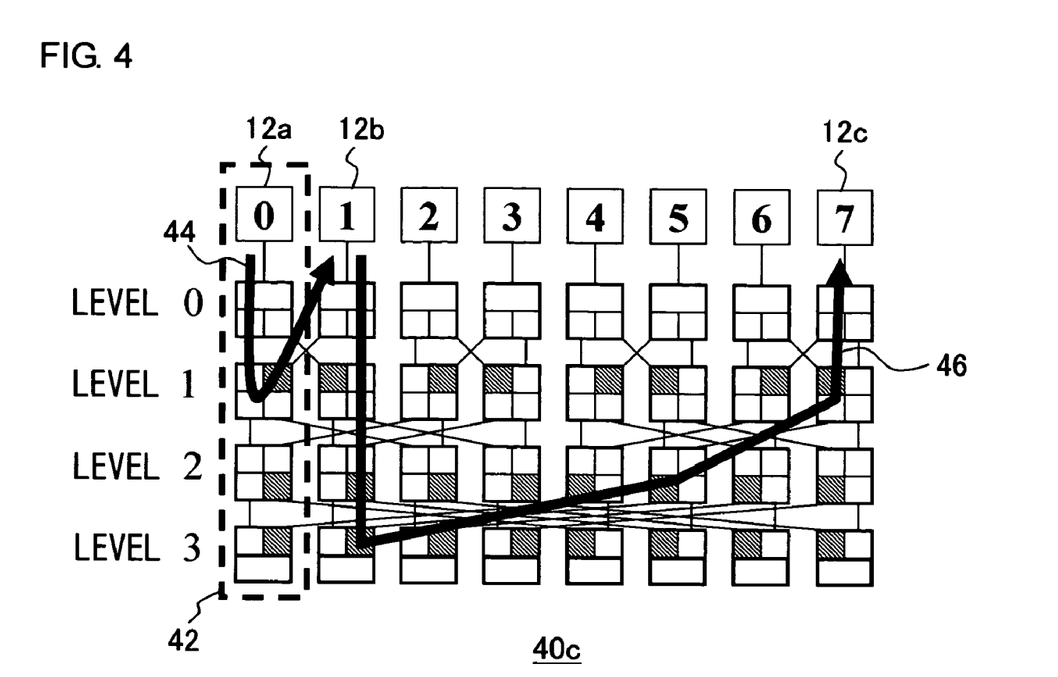
FIG. 4 is a diagram for explaining the relationship between the shortest route, node IDs, and bridge chip levels in a fat tree structure with eight processor units according to the present embodiment.

To select a transmission route that satisfies such a condition, the following rule is utilized. Initially, a bridge chip level is introduced as a parameter for the rule, aside from the node ID mentioned above. FIG. 4 shows the relationship between the shortest route of a signal, the node ID, and the bridge chip level in the information processing apparatus 40*c* with eight processor units. Here, bridge chip levels are given to the respective bridge chips 16 in ascending order from upstream to downstream. In the example of FIG. 4, the bridge chip levels include level "0", level "1", level "2", and level "3".

Likewise, node IDs are given to the respective node columns 42 in ascending order from the left. In the case shown in FIG. 4, node IDs of "0" to "7" are given from the left since the number of processor units is eight. Now, consider that each node ID is expressed in binary digits. Table 1 shows the node IDs in decimal numbers and binary numbers. The binary bit positions will be referred to as bit "0", bit "1", bit "2", and bit "3" in order from the lower bits. It should be appreciated that all the node IDs have "0" in bit 3 because 8=2³.

TABLE 1

|  |  | DECIMAL | | | | | | | |
|---|---|---|---|---|---|---|---|---|---|
|  |  | 0 | 1 | 2 | 3 | 4 | 5 | 6 | 7 |
| BINARY | BIT 3 | 0 | 0 | 0 | 0 | 0 | 0 | 0 | 0 |
|  | BIT 2 | 0 | 0 | 0 | 0 | 1 | 1 | 1 | 1 |
|  | BIT 1 | 0 | 0 | 1 | 1 | 0 | 0 | 1 | 1 |
|  | BIT 0 | 0 | 1 | 0 | 1 | 0 | 1 | 0 | 1 |

The introduction of such settings of node IDs and bridge chip levels makes it possible to uniquely determine a bridge chip level at which a signal transmitted from upstream turns in direction only once, based on the node ID of the source node column 42 of the signal and the node ID of the target node column 42 of the signal. Specifically, the node IDs of the source and the target are compared to each other in binary numbers from the upper bits. Then, the number of the lowest bit in consecutive bits having equal values between the node IDs shows the bridge chip level where the direction turns.

For example, in FIG. 4, consider that a signal issued from the processor unit 12*a* of the node ID "0" is transmitted to the processor unit 12*b* of the node ID "1". The node ID "0" and the node ID "1", in terms of binary numbers, have the same values "0" from the bit "3" to the bit "1". Of these, the lowest bit is the bit "1", which shows that the bridge chip level at which the signal changes its direction is the level "1". This shortest route of the signal is shown by the arrow 44 in FIG. 4. Similarly, suppose that a signal issued from the processor unit 12*b* of the node ID "1" is transmitted to the processor unit 12*c* of the node ID "7". In this case, the signal turns back at the bridge chip level of "3" since the node ID "1" and the node ID "7", when compared in binary numbers, have the same value "0" only in the bit "3". This shortest route of the signal is shown by the arrow 46 in FIG. 4.

This rule applies irrespective of the number of processor units 12 that constitute the information processing apparatus, and irrespective of the node IDs of the source and target node columns 42 of the signal. Then, the switch routing circuits 32 of the respective bridge chips 16 can be operated based on this rule so that signals reach desired node columns 42 through the shortest routes. Now, the algorithm of the route selection to be performed by the switch routing circuits 32 will be described.

Figure 5A:
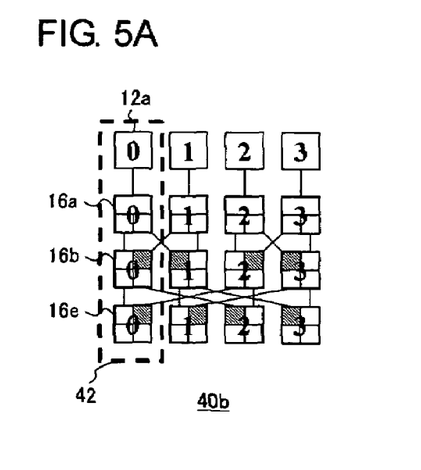
FIGS. 5A to 5C are diagrams schematically showing how initialization processing is performed on a fat tree structure with four processor units.
Figure 5B:
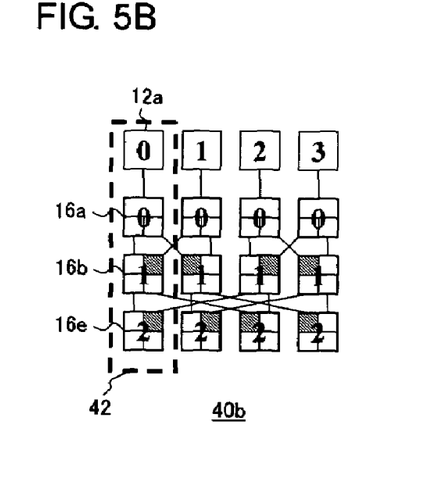
Figure 5C:
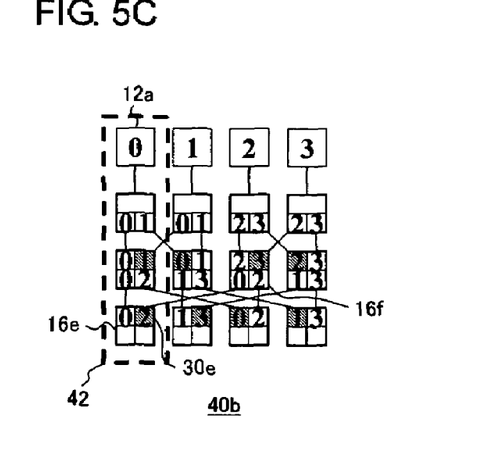

Initially, a description will be given of initialization processing for operating the switch routing circuits 32. FIGS. 5A to 5C schematically show an example of initialization processing on the information processing apparatus 40*b* which has the fat tree structure with four processor units 12. FIG. 5A shows the first stage of the initialization processing, where node IDs are given to the respective bridge chips 16. For example, the processor unit 12*a* sets its own node ID "0" into the registers 34 of the switch routing circuits 32 in the bridge chips 16*a*, 16*b*, and 16*e* that belong to the same node column 42. The same holds for the other node columns.

FIG. 5B shows the second stage of the initialization processing, where bridge chip levels are given to the respective bridge chips 16. For example, the processor unit 12*a* sets bridge chip levels of "0", "1", and "2" to the registers 34 in the bridge chips 16*a*, 16*b*, and 16*e* that belong to the same node column 42, respectively. The same holds for the other node columns. The processor units 12 grasp the bridge chip levels when configuring the respective device trees.

FIG. 5C shows the third stage of the initialization processing, where the bridge chips 16 are set with the node IDs of the node columns with which their ports are connected. The bridge chips 16 have been already given their respective node IDs in the first stage of the initialization processing. Thus, for example, the processor unit 12a refers to the setting of the node ID of the bridge chip 16f with which the bridge chip 16e, belonging to the same node column, is connected, and sets the target node ID of the end point bridge 30e included in the bridge chip 16e to "2". This value is also stored into the register 34 of the switch routing circuit 32. The same holds for the other node columns.

Figure 6:
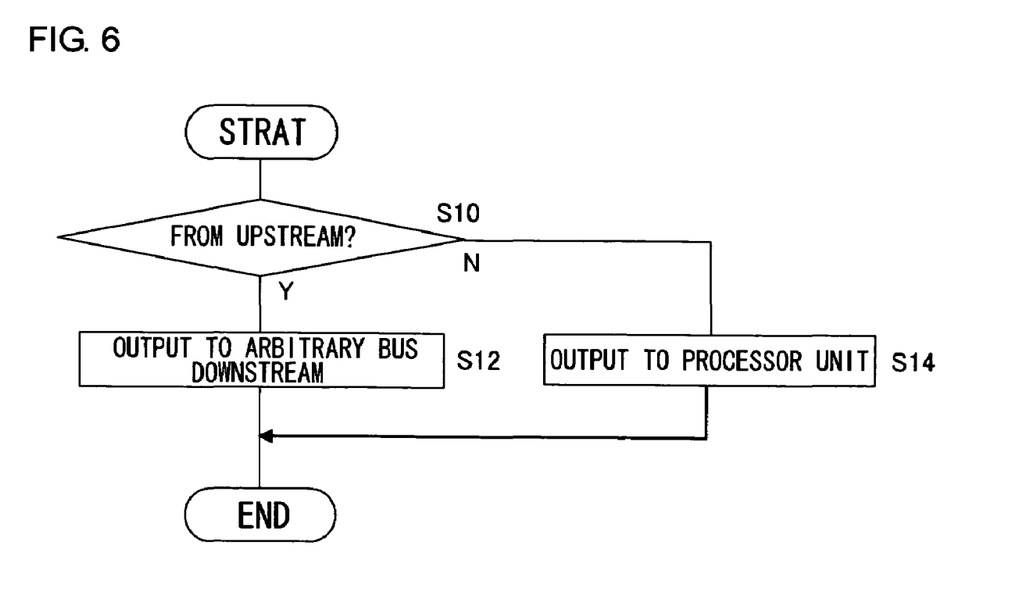
FIG. 6 is a flowchart for showing the procedure for making a route selection in a bridge chip that has a bridge chip level of "0"
Figure 7:
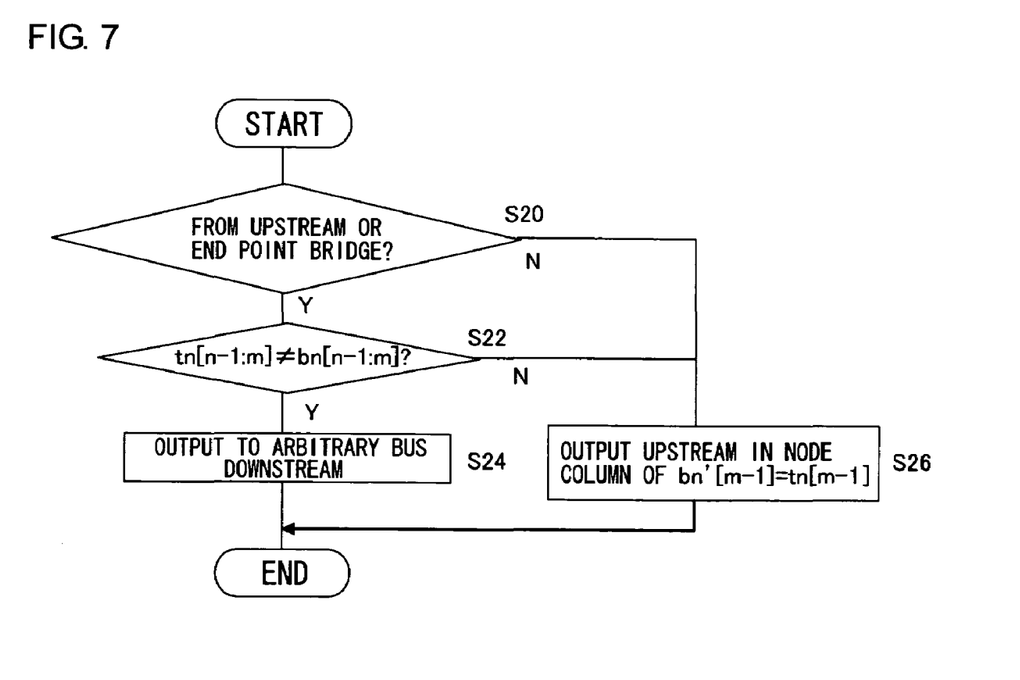
FIG. 7 is a flowchart for showing the procedure for making a route selection in a bridge chip that has a bridge chip level of "m" (0<m<n)
Figure 8:
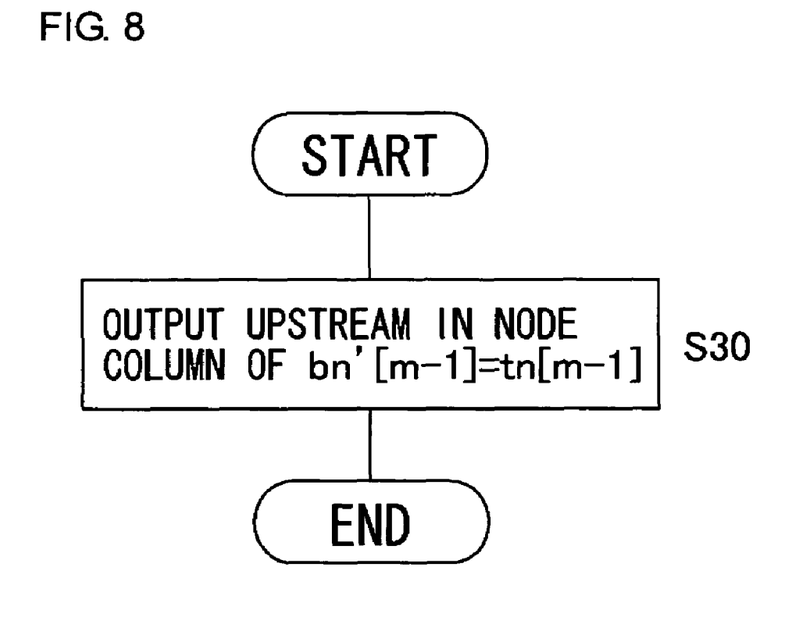
FIG. 8 is a flowchart for showing the procedure for making a route selection in a bridge chip that has a bridge chip level of "n"

Next, a description will be given of the processing in which the switch routing circuits 32 select a route by using the foregoing settings. FIGS. 6 to 8 show the procedure of the route selection processing when the bridge chips 16 acquire a signal. In these diagrams, tn[n−1:0] shall represent the target node ID, and bn[n−1:0] the node ID of the bridge chip 16 that acquires the signal. The target node ID is information included in the signal.

Here, n is the number of bits of a binary number that indicates the number of processor units 12 included in the information processing apparatus. In other words, the number of processor units 12 is $2^n$. With the fat tree structure of eight processor units 12, n=3. Then, tn[n−1:0] and bn[n−1:0] each represent a sequence that shows the values of the individual bits when the node ID is expressed in a binary number. For example, if tn[4:0]="01101", then tn[4]=0, tn[3]=1, tn[2]=1, tn[1]=0, and tn[0]=1. Note that tn[x:x] is equal to tn[x]. In the above example, tn[3:3]=tn[3]=1.

FIG. 6 shows the procedure for making a route selection in a bridge chip 16 that has a bridge chip level of "0", such as the bridge chip 16a which is connected directly below the processor unit 12a of FIG. 5A. If a signal is transmitted from upstream (Y at S10), the switch routing circuit 32 of this bridge chip 16 outputs the signal to an arbitrary bus downstream through the bus bridge 24b or 24e of FIG. 2 (S12). If the signal is transmitted from downstream (N at S10), the switch routing circuit 32 outputs the signal to the processor unit 12a upstream through the host bridge 22 of FIG. 2 (S14).

FIG. 7 shows the procedure for making a route selection in a bridge chip 16 that has a bridge chip level of "m" (0<m<n). For example, in the case of the fat tree structure with four processor units of FIG. 5A, the bridge chip 16b of level "1" represents such a chip since n=2. If a signal is transmitted to this bridge chip 16 from upstream or from the end point bridge 30 included in another bridge chip 16 (Y at S20), and tn[n−1:m]≠bn[n−1:m] (Y at S22), the switch routing circuit 32 outputs the signal to an arbitrary bus downstream through the bus bridge 24b or 24e of FIG. 2 (S24). If tn[n−1:m]=bn[n−1:m] (N at S22), i.e., when the signal reaches its turning point in view of the foregoing rule, the switch routing circuit 32 outputs the signal to an upstream bridge chip 16 that belongs to the node column having the node ID of bn'[n−1:0] where bn'[m−1]=tn[m−1] through the bus bridge 24a of FIG. 2, or outputs the signal to the end point bridge 30 that is connected to this node column (S26). If the signal is transmitted from downstream (N at S20), the same processing is performed as is the case with N at S22 (S26).

FIG. 8 shows the procedure for making a route selection in a bridge chip 16 that has a bridge chip level of "n", such as the bridge chip 16e of FIG. 5A. In this case, as in S26 of FIG. 7, the switch routing circuit 32 outputs the signal to an upstream bridge chip 16 that belongs to the node column having a node ID of bn'[n−1:0] where bn'[m−1]=tn[m−1], or the end point bridge 30 that is connected to this node column (S30).

Figure 9:
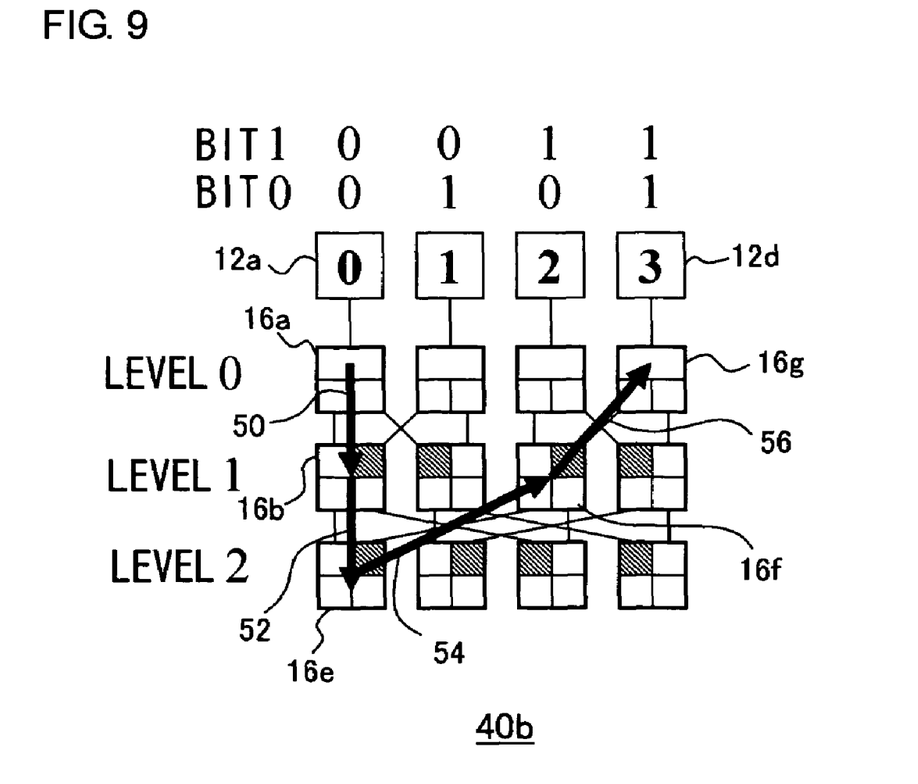
FIG. 9 is a diagram for explaining a practical example of route selection in a fat tree structure to which the present embodiment is applied.

Next, a practical example of the route selection according to the foregoing algorithm will be described. FIG. 9 shows a route for transmitting a signal from the processor unit 12a of node ID "0" to the processor unit 12d of node ID "3" in the information processing apparatus 40b which has the fat tree structure with four processor units. Here, n=2 and tn[1:0]= "11".

Initially, the bridge chip 16a of node ID "0" outputs the signal to an arbitrary bus downstream since it has a bridge chip level of "0". In FIG. 9, the signal is output to the bridge chip 16b (arrow 50). The next bridge chip 16b is of level "1" and so represents a chip where 0<m<n. Here, the bridge chip 16b has a node ID of "0", and thus bn[1:0]="00". Since tn[1:1]=tn[1]≠bn[1:1]=bn[1], the bridge chip 16 outputs the signal to an arbitrary bus downstream. In FIG. 9, the signal is output to the bridge chip 16e (arrow 52).

The next bridge chip 16e has a level of "2", which is equal to n. It therefore outputs the signal to the bridge chip 16f which belongs to the node column having a node ID of "2" where the bit "1" of the node ID is tn[1]=1 (arrow 54). The bridge chip 16f is of level "1" and so represents a chip where 0<m<n. Since the transmission shown by the arrow 54 results in tn[1:1]=tn[1]=bn[1:1]=bn[1], the bridge chip 16f outputs the signal to the bridge chip 16g which belongs to the node column of node ID "3" where the bit "0" of the node ID is tn[0]=1 (arrow 56). As a result, the signal is transmitted from the processor unit 12a to the processor unit 12d through the shortest route.

Figure 10:
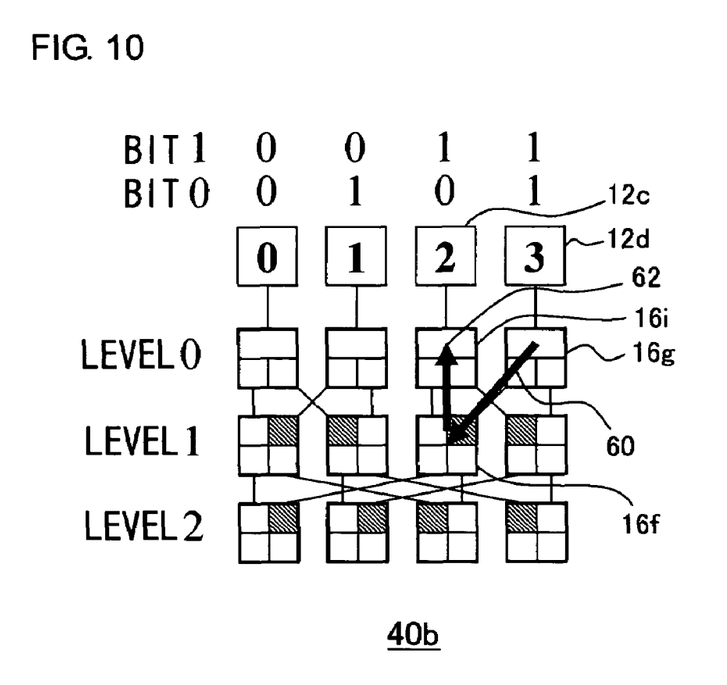
FIG. 10 is a diagram for explaining a practical example of route selection in the fat tree structure to which the present embodiment is applied.

Next, a description will be given of another example of route selection. FIG. 10 shows a route for transmitting a signal from the processor unit 12d of node ID "3" to the processor unit 12c of node ID "2" in the information processing apparatus 40b which has the fat tree structure with four processor units. Here, n=2 and tn[1:0]="10". Initially, the bridge chip 16g of node ID "3" outputs the signal to an arbitrary bus downstream since it has a bridge chip level of "0". In FIG. 10, the signal is output to the bridge chip 16f (arrow 60).

The next bridge chip 16f is of level "1" and so represents a chip where 0<m<n. Here, the bridge chip 16f has a node ID of "2", and thus bn[1:0]="10". This results in tn[1:1]=tn[1]=bn[1], and the bridge chip 16f outputs the signal to the bridge chip 16i which belongs to the node column of node ID "2" where the bit "0" of the node ID is tn[0]=0 (arrow 62). As a result, the signal is transmitted from the processor unit 12d to the processor unit 12c through the shortest route.

Figure 11:
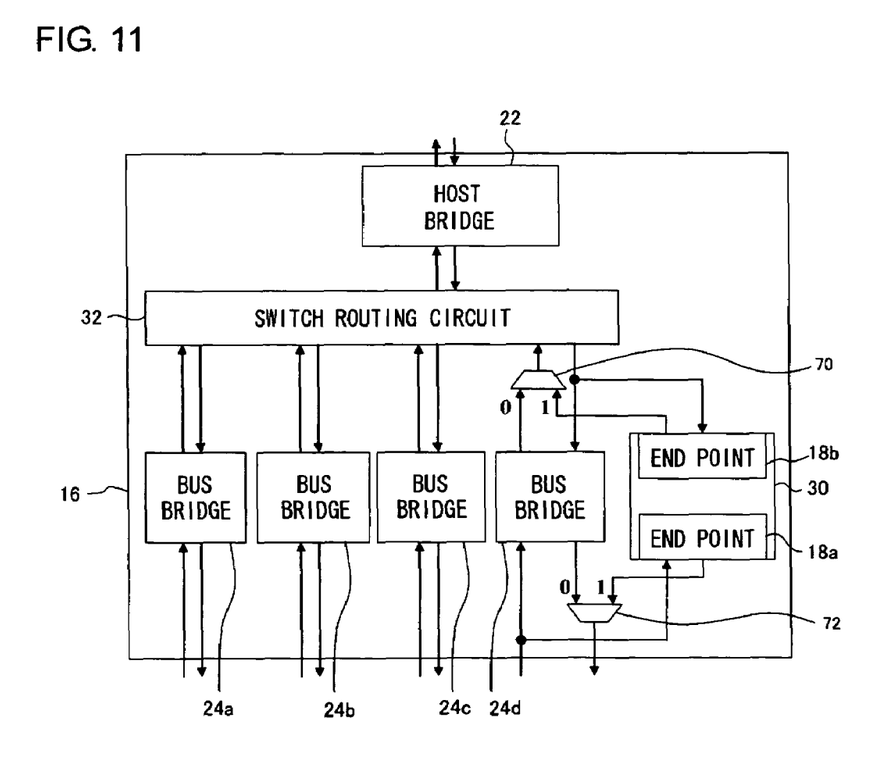
FIG. 11 is a block diagram shows the configuration of a bridge chip which has the function of switching between two routing modes.

The method of routing in a fat tree structure with a plurality of processor units described above may be combined with other routing techniques and implemented in the bridge chips 16 so that the two or more modes can be switched for use. FIG. 11 shows the configuration of a bridge chip 16 which has the function of switching between two routing modes. Like the one shown in FIG. 2, this bridge chip 16 includes a plurality of bus bridges 24a to 24d, an end point bridge 30 including end points 18a and 18b, a switch routing circuit 32, and a host bridge 22. Here, the switch routing circuit 32 contains a circuit for practicing the foregoing algorithm, as well as algorithms based on the specifications of buses such as those connected to the bus bridge 24d and the like. Such an example is a BAR (Base Address Register) based algorithm for PCI buses.

The bridge chip 16 is also provided with multiplexers 70 and 72 for selecting and outputting signals depending on the routing mode. The multiplexer 70 selects either one of the input signals from the end point bridge 30 and the bus bridge 24d according to the mode switching, and outputs it to the switch routing circuit 32. When the input signal from the end point bridge 30 is selected, the switch routing circuit 32 performs routing by using the foregoing technique for selecting the shortest route. When the input signal from the bus bridge 24d is selected, the switch routing circuit 32 performs, for example, BAR-based routing. Similarly, the multiplexer 72 selects either one of the input signals from the end point bridge 30 and the bus bridge 24d according to the mode switching, and outputs it to a bus connected to the bridge chip 16. Consequently, the single bridge chip can support a plurality of routing methods, improving its general versatility.

As has been described, in accordance with the present embodiment, the information processing apparatus including a plurality of processor units transmits signals to different processor units by performing routing based on the node-ID based algorithm. It is therefore possible to deliver signals to their destinations through the shortest respective routes, with a reduction in the time necessary for signal transmission. This allows for highly efficient information processing. Since the present embodiment is applicable irrespective of the number of processor units, it is even more effective when executing applications that require high-speed processing to be distributed, for execution, over a large number of processor units. Moreover, since the present embodiment can be achieved by modifying the circuits of the bridge chips, its introduction is less demanding in terms of design and cost as compared to other speedup measures which involve hardware improvements such as an extended bus bandwidth. Furthermore, multiplexers can be incorporated to provide other choices of routing algorithms, thereby achieving highly versatile modes of implementation suited to various user needs.

Up to this point, the present invention has been described in conjunction with the embodiment thereof. The foregoing embodiment has been given solely by way of illustration. It will be understood by those skilled in the art that various modifications may be made to combinations of the foregoing components and processes, and all such modifications are also intended to fall within the scope of the present invention.

What is claimed is:

1. A signal transmission method for transmitting a signal to be transmitted between different processor units in an information processing apparatus having a fat tree structure including a plurality of processor units, the method comprising:
    issuing a signal from one of the processor units; and
    relaying the signal by a plurality of bridge units, wherein
    the relaying of the signal includes:
    inputting the signal to a bridge unit; and
    selecting which bus to output to and outputting the signal thereto based on a number of a column to which the bridge unit belongs, the number being given to each column consisting of a processor unit and bridge units managed by the processor unit in a matrix of the fat tree structure, a level number of a row to which the bridge unit belongs, the level number being given to each row consisting of bridge units in the matrix, and a number of a column of bridge units managed by a destination processor unit.

2. The signal transmission method according to claim 1, wherein the relaying of the signal includes selecting which bus to output to so that the signal to be transmitted via the plurality of bridge units reaches the destination processor unit with only a single turn in direction from downstream to upstream.

3. The signal transmission method according to claim 1, wherein the relaying of the signal includes outputting the signal through a bridge for relaying an end point of a bus managed by the processor unit managing the bridge unit and an end point of a bus managed by another processor unit, to a bridge unit managed by the another processor unit in accordance with the selection.

4. The signal transmission method according to claim 3, wherein the relaying of the signal includes selecting which bus to output to so that the signal to be transmitted via a plurality of bridge units reaches the destination processor unit with only a single turn in direction from downstream to upstream.

5. The signal transmission method according to claim 1, wherein the relaying of the signal includes referring to binary bit strings indicating the number of a column to which the bridge unit belongs and the number of the column of bridge units managed by the destination processor unit when selecting which bus to output.

6. A bridge unit for relaying a signal to be transmitted between different processor units in an information processing apparatus having a fat tree structure including a plurality of processor units, the bridge unit comprising:
    a plurality of bus bridges;
    an end point bridge which relays signal transmission between end points of two device trees managed by two respective processor units; and
    a switch routing circuit which selects which bus to output an input signal to, wherein
    the switch routing circuit includes a register which sets a number of a column to which the bridge unit belongs, the number being given to each column consisting of a processor unit and bridge units managed by the processor unit in a matrix of the fat tree structure, and a level number of a row to which the bridge unit belongs, the level number being given to each row consisting of bridge units in the matrix, and
    the switch routing circuit selects which bus to output to based on the number of the column and the level number set in the register and a number of column of bridge units managed by a destination processor unit for the input signal to be transmitted to, and controls output accordingly so that the signal passes through any one of the bus bridges and the end point bridge.

7. The bridge unit according to claim 6, wherein:
    the switch routing circuit has a mode for practicing a routing rule based on a parameter different from the number of the column and the level number; and
    the bridge unit farther comprises a multiplexer which selects any one of output signals from the end point bridge and the bus bridges as a valid output signal depending on if the mode is selected by a user.

8. The bridge unit according to claim 6, wherein
    the fat tree structure includes $2^n$ processor units, and
    when the bridge unit has a level number m of 0<m<n:
    the switch routing circuit outputs a signal input from an upstream side of the bridge unit to an arbitrary bus downstream if $tn[n-1:m] \neq bn[n-1:m]$, and outputs the signal to a bridge unit belonging to a column having a binary sequence of bn'[n−1:0] in which $bn'[m-1]=tn[m-1]$ if $tn[n-1:m]=bn[n-1:m]$; and the switch routing circuit always outputs a signal input from a downstream side of the bridge unit to a bridge unit belonging to a column having a binary sequence of bn'[n−1:0] in which $$bn'[m-1] = tn[m-1],$$

where tn[n−1:0] is the binary sequence of the number of a column of bridge units managed by the destination processor unit, and bn[n−1:0] is the binary sequence of the number of a column to which the bridge unit belongs.

9. The bridge unit according to claim 8, wherein:
the switch routing circuit has a mode for practicing a routing rule based on a parameter different from the number of the column and the level number; and
the bridge unit further comprises a multiplexer for selecting any one of output signals from the end point bridge and the bus bridges as a valid output signal depending on if the mode is selected by a user.

10. An information processing apparatus comprising:
a plurality of processor units; and
a bridge unit which relays a signal to be transmitted between different processor units,
the bridge unit including:
a bus bridge which relays signal transmission within a device tree managed by a single processor unit;
an end point bridge which relays signal transmission between end points of two device trees managed by two respective processor units; and
a switch routing circuit which selects either one of the bus bridge and the end point bridge to which an input signal to be transmitted between different processor units is output so that the input signal reaches a destination processor unit through a shortest route, based on a column number and a row number in a matrix consisting of the bridge units.

11. A bridge unit for relaying a signal to be transmitted between different processor units in an information processing apparatus having a fat tree structure including a plurality of processor units, the bridge unit comprising:
a plurality of bus bridges;
an end point bridge which relays signal transmission between end points of two device trees managed by two respective processor units; and
a switch routing circuit which selects which bus to output an input signal to, wherein
the switch routing circuit includes a register which sets an identification number of a column in the fat tree structure to which the bridge unit belongs, and a level number of a row to which the bridge unit belongs, and
the switch routing circuit selects which bus to output to based on the identification number and the level number set in the register and an identification number of column of bridge units managed by a destination processor unit for the input signal to be transmitted to, and controls output accordingly so that the signal passes through any one of the bus bridges and the end point bridge, wherein
the fat tree structure includes $2^n$ processor units, and the bridge unit has a level number m of 0<m<n:
the switch routing circuit outputs a signal input from an upstream side of the bridge unit to an arbitrary bus downstream if $$tn\ [n-1:m] \neq bn\ [n-1:m],\ \text{and}$$

outputs the signal to a bridge unit belonging to a column having a binary sequence of identification number bn' [n−1:0] in which bn' [m−1]=tn [m−1]

if $$tn\ [n-1:m] \neq bn\ [n-1:m];\ \text{and}$$

the switch routing circuit always outputs a signal input from a downstream side of the bridge unit to a bridge unit belonging to a column having a binary sequence to identification number bn' [n−1:0] in which $$bn'\ [m-1] = tn[m-1],$$

where tn [n−1:0] is the binary sequence of identification number of a column of bridge units managed by a destination processor unit for the input signal to be transmitted to, and bn [n−1:0] is the binary sequence of identification number of the bridge unit.

* * * * *